United States Patent [19]

Jenner

[11] Patent Number: 4,648,031

[45] Date of Patent: Mar. 3, 1987

[54] METHOD AND APPARATUS FOR RESTARTING A COMPUTING SYSTEM

[75] Inventor: Earle H. Jenner, San Jose, Calif.

[73] Assignee: International Business Machines Corporation, Armonk, N.Y.

[21] Appl. No.: 390,163

[22] Filed: Jun. 21, 1982

[51] Int. Cl.$^4$ ............................................. G06F 12/00
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 3,905,023 | 9/1975 | Perpiglia | 364/200 |
| 4,123,795 | 10/1978 | Dean, Jr. et al. | 364/200 |
| 4,438,494 | 3/1984 | Budde et al. | 364/200 |

OTHER PUBLICATIONS

"Operating Systems—An Advanced Course", by R. Bayer et al, (Eds.), Springer-Verlag, 1978, 459–481.
"Database Security and Integrity", by E. B. Fernandez et al, Addison-Wesley, 1981, 280–286.
IBM Information Management System (IMS/VS), Program Number 5740-XX2, Version 1.1.5.
IBM Customer Information Control System (CICS/VS) Version 1.5, System/Application Design Guide, IBM Publication SC33-0068, pp. 237–246.

Primary Examiner—Thomas M. Heckler
Attorney, Agent, or Firm—Shelley M. Beckstrand; Henry E. Otto, Jr.

[57] ABSTRACT

A programming method and structure for operating a computing system to restart a total subsystem or a subset of that subsystem to an operable state following a total interruptions (system failure or termination, either normal or abnormal). The subsystem isolates inoperable resources while permitting the others to resume by independently maintaining in a first structure recording the completion state of a resource manager's recovery responsibility with respect to each interrupted work unit and in a second structure the operational states and recovery log interest scopes of each resource manager. The completion state can be influenced by the starting or not of a resource manager, and if restarted, the presence or absence of a resource subset required to accomplish the work unit recovery.

16 Claims, 9 Drawing Figures

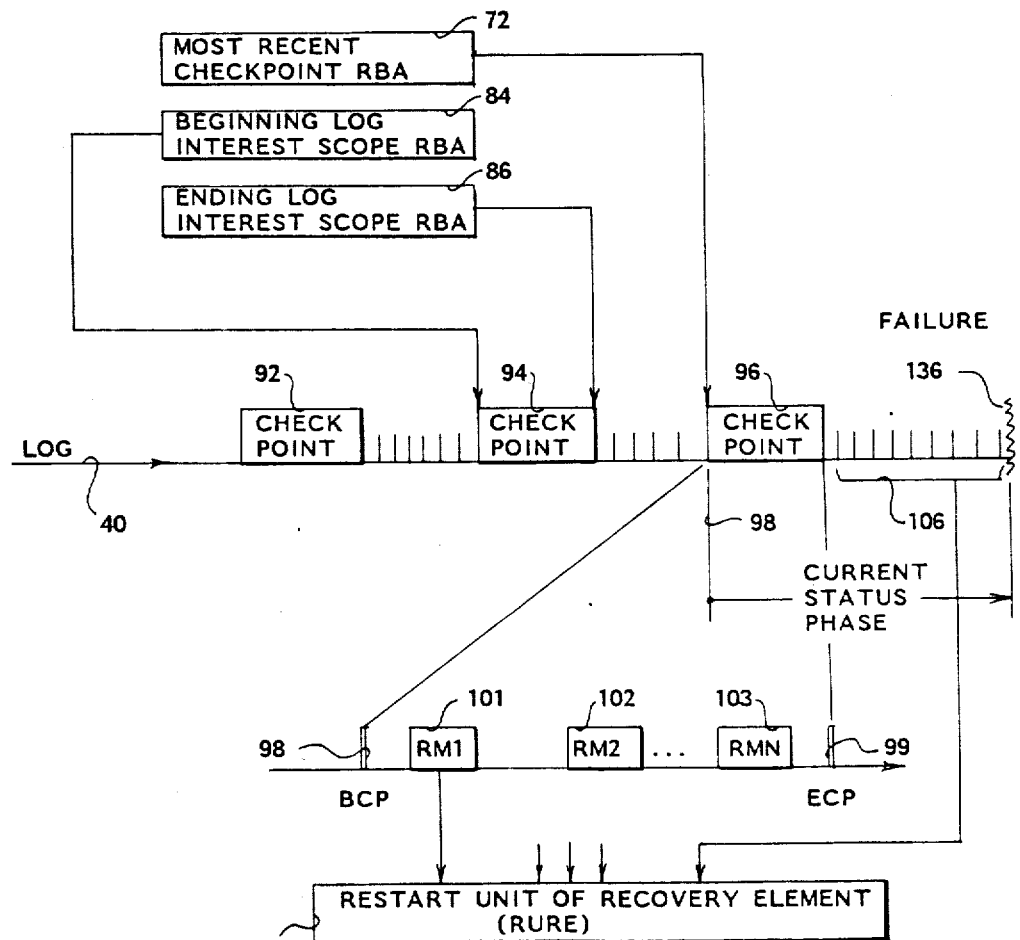
FIG. 3 RESOURCE MANAGER STATUS TABLE (RMST)
FIG. 4 RESOURCE MANAGER STATUS TABLE (RMST)

METHOD AND APPARATUS FOR RESTARTING A COMPUTING SYSTEM

BACKGROUND OF THE INVENTION

1. Field of the Invention

This invention relates to a new system configuration and method for operating a computing apparatus. More specifically, it relates to the use of a recovery log for restarting a computing system following normal or abnormal termination.

2. Description of the Prior Art

In the operation of computing systems, it is the practice to provide a programming subsystem which includes a plurality of resource managers. Such resource managers control the operation of system resources (hereinafter also called resource collections) such as data bases, teleprocessing or other communication facilities, and the system itself. Further, there may be a plurality of data base resource managers managing separate or shared data base facilities, a plurality of teleprocessing resource managers, and a plurality of system resource managers—such as in a multi-programming, multi-processor environment.

It is, unfortunately, a characteristic of computing systems that failures occur which cause the abnormal termination of the system, the communication links, the data bases, and/or their managers. Such failures may leave, for example, a data base in an inconsistent state, or require that other resources or their managers not directly affected by the failure also suspend operation.

In order to facilitate the recovery of resource managers and the facilities or objects which they manage, it is known to write (hereinafter also called externalizing) at specified processing points, a system log containing the states of the resource collections (hereinafter called checkpointed states) to non-volatile storage together with before and after images of changes made to the resource collections. Examples of systems using such a system log are the IBM Information Management System (IMS/VS), Program No. 5740-XX2, and Customer Information Control System (CICS/VS), the latter being described in CICS/VS Version 1.5 System/Application Design Guide, SC33-0068, at pages 237-246. In these systems, during an emergency restart operation, the resource managers use the information in the log to perform their respective recovery responsibilities such as restoring the data base to a consistent state, reestablishing control block content, and backing out the effect of interrupted work unit activity on resources. However, there is no provision for restarting a subset of the resource managers, nor to defer the recovery of selected work units due to the unavailability of certain resources.

Consequently, there is a need in the art for the capability to restart all or a subset of the resource manager components of a subsystem, and all or a subset of the subsystem's resources. When components or the resources they manage are not available to the restart process, and have been made inconsistent by the actions of interrupted work unit activity, there is a need for mechanisms to remember these outstanding work unit recovery requirements until the components or resources become available.

SUMMARY OF THE INVENTION

The invention provides an improved control structure and method for operating a computing apparatus which is being interrupted and restarted from time to time. The computing apparatus includes a plurality of resource managers and resource collections such as data bases and including a recovery log. The computing apparatus is executing work unit instructions, and writing log records to the recovery log, the log records including checkpointed states and records of changes to the resource collections and resource managers resulting from execution of work unit instructions. A subset of the resource managers are responsible for the execution work of units and have responsibilities in recovering the work units during restart. The method of the invention is characterized by the steps of:

maintaining in a first structure with respect to each interrupted work unit, the location of a respective section of the recovery log which contains information of its activities and the recovery responsibility of each resource manager to the work unit; and maintaining in a second structure with respect to each of said subset of said resource managers (1) its operational state and (2) the location of a respective different section of the recovery log which contains information that particular resource manager needs to perform its recovery responsibility.

BRIEF DESCRIPTION OF THE DRAWINGS

FIG. 3 is a diagram of a resource manager status table maintained in the subsystem recovery data set of FIG. 1 by the recovery manager component.

FIG. 4 is a diagrammatic illustration showing the relationship between the resource manager status table of FIG. 3 and the recovery log of FIG. 2.

DESCRIPTION OF THE PREFERRED EMBODIMENT

This application is related to application serial number 06/390,454 filed June 21, 1982 for "Method and Apparatus for Logging Journal Data in a Continuous Address Space Across Main Storage, Direct Access, and Sequential Access Devices," by C. Mellow, et al, abandoned, assigned to the same assignee as the present invention. The apparatus and method of this invention makes use of the continuous journal log of Mellow, et al, to enhance the recovery characteristics of a data base management system. System recovery of the apparatus is further enhanced by the two-phase commit protocol. The two-phase commit protocol is well known in prior art and is described in "Operating Systems—An Advanced Cource" by R. Bayer et al (Eds.), Springer-Verlag, 1978, 459–481 and in "Database Security and Integrity" by E. B. Fernandez et al Addison-Wesley 1981, 280–286.

Figure 1:
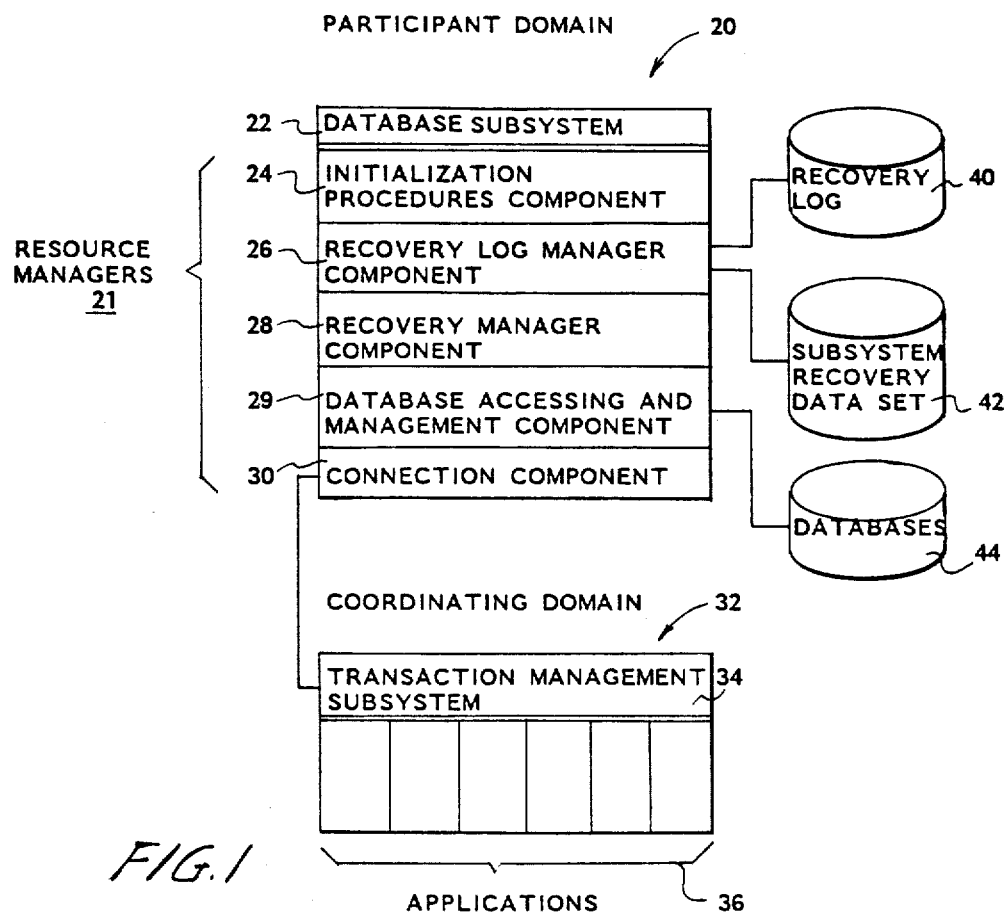
FIG. 1 is a diagrammatic illustration of computing system showing the recovery manager component of the invention.

Referring to FIG. 1, there is illustrated a portion of a computing apparatus, showing participant domain 20 and coordinating domain 32 within the volatile main storage address space of a central electronic complex, or computing apparatus, together with recovery log 40, subsystem recovery data set 42, and resource collection such as data bases 44 in non-volatile storage. The computing apparatus may be an IBM System/360 or System/370, described in U.S. Pat. No. 3,400,371 by G. M. Amdahl, et al, and in IBM System/370 *Principles of Operation, IBM Publication GA*22-7000-6.

Participant domain, or subsystem 20 is a data base subsystem 22, including for example, initialization procedures component 24, recovery log manager component 26, recovery manager component 28, data base accessing and management component 29, and connection component 30. Components 24, 26, 28, 29, and 30 are examples of resource managers 21, and data base 44 is an example of recoverable objects or resources.

Coordinating domain 32 includes a transaction management subsystem 34, and one or more application programs 36. Application programs 36 originate work units, which are passed by transaction management subsystem 34 to the participant domain for execution by the resource managers 21, for example, against resources 44.

Recovery manager (RM) 28 is responsible for the coordination, control, and log record retrieval and presentation functions which occur during the restart process. When participant domain 20 is cold started, it undergoes an initialization process under the control of initialization procedures component 24 to bring it to an operable cold state having no knowledge of a prior existence. However, when participant domain 20 is restarted, following either a normal or an abnormal termination, it enters a warm state by refreshing its memory from information found in recovery log 40. Recovery log 40 represents a chronological record of the events and actions of work units originated by, for example, applications 36, upon the resource collections 44 managed by domain 20. The contents of recovery log 40 reflect events which advance the progress states of work units, and which alter the content of recoverable resources and change the state of resource collections 44.

Recovery manager 28 supports the restoration of recoverable resources 44 managed by participant domain 20 resource managers 21 to their most recent consistent state which existed prior to or at the time of the previous termination of participant domain 20, controls the use of recovery log 40, provides a restart environment that supports both a total domain 20 restart and the restarting of a subset of that domain, provides a restart and operation environment wherein a subset of the domain can be restarted after the rest of the domain is operational with the existence of the operational subset transparent to the restarting subset, and provides the capability to cold start a resource manager 21 such that its recovery responsibilities are performed outside of the participant domain 20 environment with the resource manager started but its participation in the restart process bypassed.

Resource Managers 21

Resource managers 21 are participant domain 20 components which provide services to other components and to application programs 36. Initialization procedures component 24 controls the initialization process, above. Recovery manager component 28 controls the memory refreshing process, above. Recovery log manager component 26 provides log 40 recording and retrieving services; the Mellow, et al application previously mentioned is an example of a recovery log manager component 26. Data base accessing and management component 29 provides databases 44 recording and retrieving services.

Resource managers 21 participate in various domain 20 events by providing event notification exit routines which are invoked by the controllers of those events through broadcasts, to be described hereafter. Resource managers 21 participate in their own initialization process through this broadcast mechanism, and in attaining the warm restart state by providing routines which receive event notification and log record presentation broadcasts from recovery manager component 28.

Linked Log Records

Figure 2:
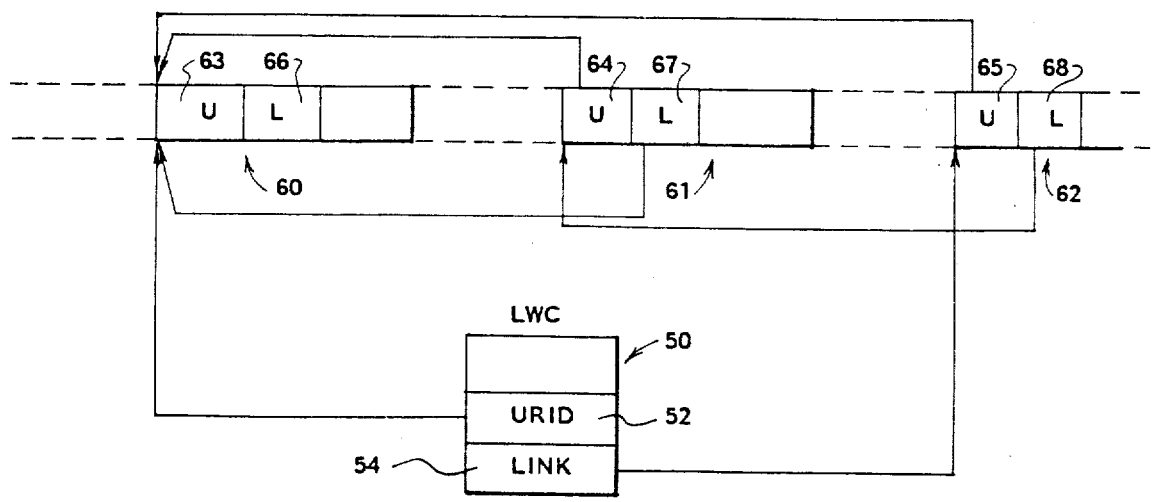
FIG. 2 is a diagrammatic illustration of the manner in which log records are linked on the recovery log shown in FIG. 1.

Referring now to FIG. 2, a description will be given of the format of Log 40 and of the function provided by recovery log manager component 26 to support the recovery activity managed by recovery manager component 26. In the copending application of C. Mellow, et al, recovery log 40 and recovery log manager component 26 are further described. Recovery log manager component 26, responsive to a request from recovery manager 28 to write a log record at the beginning of a unit of recovery (begin UR record 60), creates log write cursor 50, including unit of recovery ID (URID) field 52 and link field 54. A log write cursor 50 is created and maintained for the life of each work unit, or unit of recovery, and is used to provide certain header information in UR log records written to recovery log 40. In FIG. 2, three such log records 60, 61, and 62 are shown, each having in its header U fields 63–65 and L fields 66–68, respectively. Recovery log manager 26 inserts into URID field 52 the log relative byte address (RBA) of the begin UR record 60, the first UR record for this unit of recovery, or work unit. The same URID 52 RBA value will be inserted into the U field 63, 64, 65, . . . , of each log record 60, 61, 62, . . . , created for this unit of recovery. When begin UR record 60 is created, L field 66 is set to null, thus identifying log record 60 as the beginning record in the chain. Also, LINK field 54 is set equal to URID 52 RBA to point to record 60, as it is also the last record of the chain at the time it is written originally to the log. In response to a request from data base accessing and management component 29 to write a log record 61 for a unit of recovery which already exists, recovery log manager component 26 updates the link field 54 with the RBA value of record 61, inserts the previous LINK 54 field value into L field 67, to point to the previous UR log record 60, and inserts the URID 52 value into U field 64. UR log record 62 is similarly created, resulting in the log record chain illustrated in FIG. 2 for a given unit of recovery which, in this example, includes three log records, with the pointer arrows pointing to the location specified by the RBA values stored in each of the log write cursor 50 and log records 60–62 fields.

First Data Structure—Resource Manager Status Table (RMST) 70

In order that recovery manager component 28 support the early termination and deferred restarting of selected resource managers 21, (herein a component 29 is the only logical candidate) the operational states and recovery log interest scopes of each resource manager 21 are independently maintained. An intersect scope of the recovery log is the section of the log a resource manager is interested in reading to perform its recovery responsibility. Also, the recovery responsibilities of resource managers 21 as they apply to interrupted recoverable work units are maintained for each work unit. The two recovery manager 28 structures which perform this function are resource manager status table 70 and restart unit of recovery element 90.

Relative byte addresses (RBAs) refer to the continuous log data addressing range value assigned to any record written to recovery log 40. An RBA value is time-ordered and unique within domain 20 and the recovery log 40 it manages. Two such RBA values are used to delimit the upper and lower bounds of the recovery log 40 interest scope of a resource manager 21 or the log activity scope of a work unit which is section of the log containing information (e.g. data changes) about the work unit.

Referring to FIG. 3 in connection with FIG. 4, a description will be given of the resource manager status table (RMST) 70. RMST 70 includes in its header most recent checkpoint RBA field 72, flip/flop control field 74, and RMST entries changed flag field 76. Then follow entries for each resource manager 21, including RM identifier 80, operational status 82, beginning log interest scope RBA 84, and ending log interest scope RBA 86. Operational status 82 fields indicate if the resource manager is active or terminated, and if terminated, whether the termination was normal or early. For terminated resource managers only, fields 84 and 86 contain RBA values pointing to recovery log 40 records.

An operational copy of RMST 70 is constructed during recovery manager 28 initialization from a copy externalized on subsystem recovery data set 42. The content of the recovery data set 42 copy of RMST 70 describes the last consistent configuration of the resource managers 21 comprising subsystem 20 prior to or as of its last termination. The operational copy of RMST 70, maintained by recovery manager component 28 in main storage, is updated as resource managers 21 restart or terminate and is externalized to recovery data set 42 during checkpoint events which write checkpoints 92, 94, 96, . . . , to recovery log 40. Each checkpoint 92, 94, 96 includes one or more checkpoint records 101–103, with zero to 'n' checkpoint records for each resource manager 21 participating in the checkpoint. Header portion 71 of the operational copy of RMST 70 is externalized to subsystem recovery data set 42 during each subsystem 20 checkpoint. RMST 70 entries 73 identifying each resource manager 21 known to recovery manager 28 are only externalized to subsystem recovery data set 42 in connection with the writing of checkpoints 92, 94, 96, . . . , to recovery log 40 associated with a change in status of a resource manager 21. Dual copies of RMST header 71 and of RMST entries 73 are maintained by recovery manager 28 on recovery data set 42 using flip/flop control key 74, the value of which alternates with each successive write to recovery data set 42. This procedure assures that a prior consistent copy of RMST entries 73 will not be destroyed as a result of a failure while externalizing a new copy of RMST entries 73 to recovery data set 42.

Most recent checkpoint RBA 72 field gives the RBA of the record on log 40 delimiting the start, or beginning checkpoint (BCP) record 98 of most recent subsystem checkpoint 96. The ending checkpoint (ECP) record 99 delimits the end of checkpoint 96. The most recent checkpoint RBA 72 value is used during recovery manager 28 initialization in determining which of the dual copies of RMST header 71 represents the most recent checkpoint taken. It is also used to establish the beginning log interest scope of all resource managers 21 which, according to the copy of RMST 70 on recovery data set 42, were in an active operational state at the time of the prior termination of subsystem 20.

Flip/flop control field 74 is the key suffix used when externalizing the most recent copy of RMST entries 73. This value is used during recovery manager 28 initialization to determine which of the dual copies of RMST entries 73 on recovery data set 42 represents the most recent configuration.

RMST entries changed flag 76 provides an indication of whether or not the status information maintained in fields 82 of the operational copy of RMST 70 have changed since the last checkpoint was taken. This field 76 is used to determine if entries 73, in addition to header 71, must be externalized to recovery data set 42 during the next checkpoint to recovery log 40.

Operational status fields 82 identify the operational states of the resource managers 21 (RM1, RM2, . . . ,RMN) as represented by recovery manager 28. Status fields 82 are used during recovery manager 28 initialization to determine whether or not related resource manager 21 was operationally active as of the prior subsystem 20 termination. Status field 82 is set upon completion of a restart or termination involving the related resource manager 21, as well as during recovery manager 28 initialization. Operating states include active, terminated, and cold. An operational status 82 of active state indicates that the related resource manager 21 has undergone restart and is currently operational. Terminated state indicates that the related resource manager 21 has terminated, with state subqualifiers indicating if the related resource manager 21 terminated early or concurrent with subsystem 20. Cold state indicates that related resource manager 21 is to be restarted to an operational state with no knowledge of a prior existence; this status 82 allows the recovery responsibilities of one or more resource managers 21 to be performed outside of participant domain 20. Any outstanding recovery responsibilities being remembered by recovery manager 28 are treated as completed for cold starting resource managers 21.

Beginning log interest scope RBA field 84 specifies the RBA of the log 40 checkpoint record delimiting the start of the most recent checkpoint 94 participated in by the related resource manager 21. Its value is established during a termination checkpoint involving the related resource manager 21, or during recovery manager 28 initialization if the related resource manager 21 was in an active operational state 82 as of the prior subsystem 20 termination. It is used as the lower bound for positioning the log when restarting the related resource manager 21.

Ending log interest scope RBA field 86 specifies the RBA of the log 40 checkpoint record delimiting the end of the most recent checkpoint 94 participated in by the related resource manager 21. This value is established during a termination checkpoint involving the related resource manager 21, or by recovery manager 28 during the first phase of the next subsystem 20 restart. It is used as the upper bound for positioning recovery log 40 when restarting the related resource manager 73.

Recovery manager 28 uses the independent resource manager beginning and ending log interest scope RBA fields 84 and 86 to restart with subsystem 20 those resource managers 21 which terminated early, or alternatively to restart them after the rest of subsystem 20 is operational.

Second Data Structure—Restart Unit of Recovery Element (RURE)

The second of the two recovery manager 28 structures which perform the function of independently maintaining the operational states and recovery log interests scopes of each resource manager 21 is restart unit of recovery element (RURE) 90. The first such structure, RMST 70, is described above.

A unit of recovery (UR) is a term referring to the actions of a recoverable work unit between points of logical consistency; that is, between commit points. Generally, the term "work unit" will be used to refer to a unit of recovery.

Figure 5:
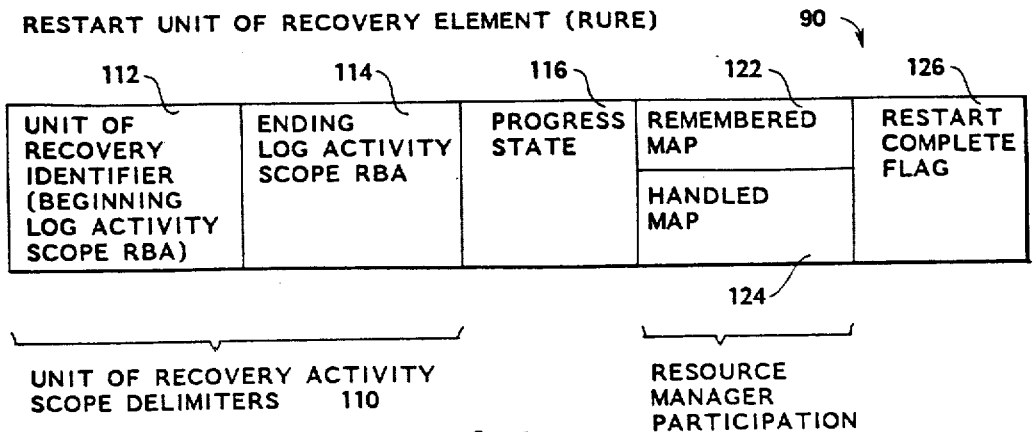
FIG. 5 is a diagram of a restart unit of recovery element maintained by the recovery manager component of FIG. 1.

RURE 90 is the recovery manager 28 structure representing a recoverable work unit which was interrupted by subsystem 20 termination. The exact extent of the effect of the work unit on subsystem 20 managed resources, such as recoverable objects in data bases 44, cannot be determined without examining recovery log 40. The recovery responsibilities of resource managers 21 which provide services to the work units will depend on the records 106 those resource managers contributed to log 40 on behalf of the work unit, and the progress state attained by the work unit, and tracked on log 40 by recovery manager 28. Referring to FIG. 5, RURE 90 contains unit of recovery activity scope delimiters 110, including unit of recovery identifier (which is the beginning log activity scope RBA 112 of the work unit) and work unit ending log activity scope RBA 114, progress state 116, resource manager participation maps 120 including remembered map 122 and handled map 124, and restart completion flag 126.

Resource manager participation maps 120 are provided in each RURE 90 to reflect the disposition of resource manager 28 recovery responsibilities on a per-work-unit basis. A resource manager identifier 80 value is used as the bit index into each participation map 120. The bit settings in the two maps 122, 124 indicate the resource managers 21 which have an interest in log records 106 contributed on behalf of the work unit, and whether or not the resource managers 21 have performed the recovery responsibilities associated with the work unit.

During creation of the participation maps 120:

1. A zero in a given index position in both maps 122, 124 indicates no log records 106 of interest to that resource manager 21 whose identifier 80 indexes to the given index position have been encountered in log 40 within the work unit's activity scope 110. If the work unit's entire log activity scope 110 is processed and both map 122, 124 positions remain zero, the resource manager had no recovery responsibilities associated with the work unit. That resource manager will not be involved if a subsequent recovery process on behalf of the work unit is required.

2. A zero in a given index position in remembered map 122 and a one in the same position in handled map 124 indicates that the resource manager has an interest in log 40 records 106 contributed on behalf of the work unit and has handled its recovery responsibilities for all records thus far encountered within the work unit's log activity scope 110. If the entire work unit's log activity scope 110 is processed and both map 120 positions remain as described it indicates the resource manager had a recovery responsibility associated with the work unit and completed that responsibility. The resource manager will be bypassed if a subsequent recovery processing of the work unit is required.

3. A one in a given index position in remembered map 122 indicates the resource manager has an interest in log records contributed on behalf of the work unit but for some reason has been unable to perform its recovery actions. A resource manager 21 may have contributed log records 106 on behalf of the work unit but, because the resource manager 21 was either not restarting, or was restarting but activation of a needed resource within collection 44 was deferred, has not fulfilled its responsibilities. The resource manager 21 will participate in a subsequent work unit recovery processing when the resource manager 21 next restarts, or when the resource within collection 44 is activated.

4. If, after a work unit's log activity scope 110 has been processed, all bit positions in remembered map 122 are zero, it indicates that all resource managers 21 have fulfilled their recovery responsibilities associated with the work unit. In this case, recovery manager 28 drops the associated work unit from its collection of work units still requiring recovery processing.

Restart completed flag 126 indicates whether or not the work unit has undergone its restart processing before. If it has, previously created handled 124 and remembered 122 participation maps 120 exist, and are used in determining which resource managers 21 should or should not participate in the recovery processing of a given work unit. If the work unit has not been through restart processing the participation maps must be created, and therefore cannot be used in determining resource manager participation.

Recovery manager 28 builds RURE's 90 from checkpoint records 101, 102, . . . , 103, and from log records 106 recorded by resource managers 21 outside of the checkpoint which reflect the addition, deletion, or modification of work units.

REDO/TODO/UNDO

Figure 6:
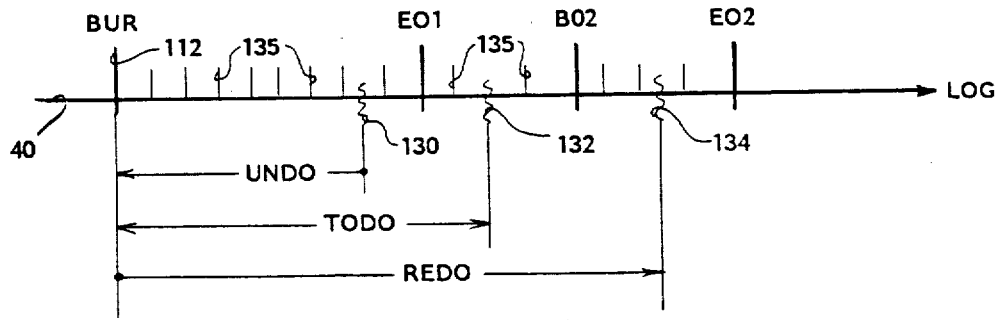
FIGS. 6 and 7 are diagrammatic illustrations of recovery log for use in explaining the UNDO, TODO, and REDO procedures executed by the recovery manager component of the invention.

Referring now to FIG. 6, recovery processes REDO, TODO, and UNDO will be described. Restarting following an unplanned subsystem 20 termination involves the restoration of resources 44 left in a potentially inconsistent state due to work unit interruption. The three work unit recovery processes are REDO, TODO, and UNDO. The three possible points of interruption are shown at points 130, 132, and 134, each following the unit of recovery beginning (BUR) 112, but in varying positions with respect to log records recorded with respect to end of commit phase 1 (EO1), beginning of commit phase 2 (BO2), and end of commit phase 2 (EO2).

REDO is the forward recovery process of insuring recoverable resource 44 consistency when a work unit is interrupted at point 134 after subsystem 20 and all other interested participant domains have agreed (as is represented by BO2) to commit the actions of the work unit, but before completion of the committed actions (at EO2). Resource managers 21 are expected to insure that the most recent agreed-to resource state is externalized, for example, onto data base 44.

TODO is the forward recovery process necessary to relock, or otherwise exclusively reallocate the use of recoverable resources 44 to a work unit interrupted at point 132 while in a commit-in-doubt state (between EO1 and BO2). A commit-in-doubt state exists when a participant domain 20, requested by a coordinating domain 32 (a subsystem connected to subsystem 20) to vote on continuing a work unit's commit processing, returns a positive vote and is awaiting the final commit decision (vote outcome) from coordinating domain 32. The work unit affected is said to be "indoubt" within participant domain 20 until the final vote outcome has been received. Resource managers 21 are expected to insure the recoverable resources 44 altered by the work unit remain inaccessible to other work units until the indoubt situation has been resolved, and resource consistency has been established.

UNDO is the backward recovery process of insuring recoverable resource 44 consistency when a work unit is interrupted at point 130 before subsystem 20 has agreed (EO1) to commit the actions of the work unit. Resource managers are expected to reverse the affect of the work unit's activity on recoverable resources 44 such that the resources are restored to their most recent committed state BUR 112 which existed prior to the point 130 of the interruption.

Recovery manager 28 is responsible for recording commit control records BUR, EO1, BO2, and EO2. Once EO2 has been recorded, the work unit is completed. Image records 135 on log 40 are recorded by the various resource managers 21, and are used to roll forward and backward objects 44 that are inconsistent.

Restart Invocation

The restart process is requested by an initialization process which occurs at the beginning of time or following some system interruption. Recovery manager 28 not only controls the entire restart process, but as a resource manager 21, participates in the restart event notification and log record presentation broadcasts through the same mechanisms used by other participating resource managers 21.

Figure 7:
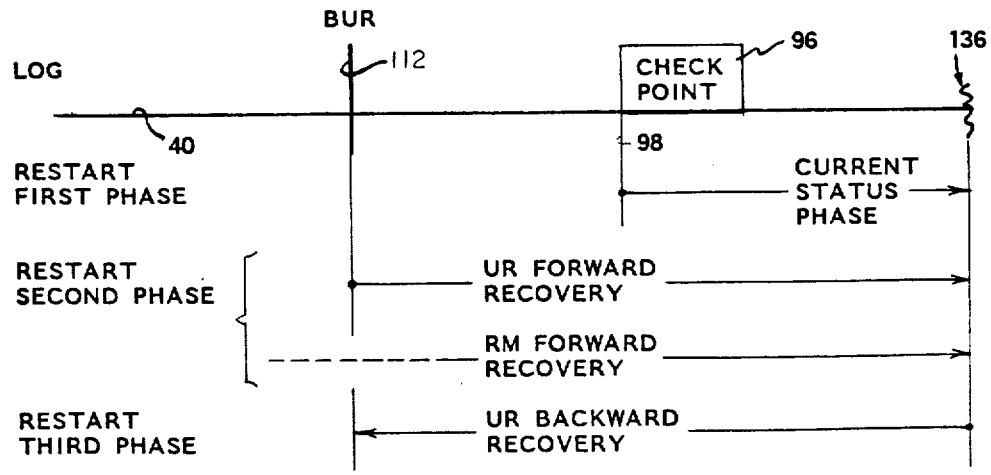

Referring to FIG. 7, restart processing comprises three phases: (1) first restart phase, including the current status phase; (2) second restart phase, including an UR forward recovery and a RM forward recovery process; and (3) third restart phase including UR backward recovery.

Two event notification broadcasts, a BEGIN and an END, delimit the entire restart process. In addition, each phase has BEGIN and END phase delimiting broadcasts. These broadcasts are made to all resource managers 21 involved in the current restart processing. Parameter lists are passed as input to the resource managers 21 receiving a broadcast, and in some cases include a feedback area in which the resource managers 21 return information relative to the broadcast. Resource managers 21 supporting these broadcasts do any necessary preparatory or completion work appropriate to that portion of the restart process.

Other restart broadcasts for each phase are directed to participating resource managers 21, as will be described hereafter.

First Restart Phase—Current Status Phase

Referring to FIG. 7, the objective of the current status phase is to reestablish the representation of the states of resources 44 as of the point of prior termination 136. During normal processing, subsystem 20 uses a checkpoint technique to periodically record summary resource status information 101, 102, . . . ,103 on recovery log 40. The identity of the most recent checkpoint 96 is retained by subsystem 20 across any termination 136 by recording it in the subsystem recovery data set 42 and/or recovery log 40. During the current status phase, that checkpoint's 96 content is used by the contributing resource managers 21 (RM1, RM2, . . . ,RMN) as a base representation of their resource collection 44 states. Examples of these resources 44 and their checkpointed states are: (1) all defined data bases 44 and the identity of those on-line or off-line at the time of the termination 136; (2) the identity and progress state of all recoverable work units (such as those originated by applications 36) interrupted by the termination 136; (3) the identity of external media collections 44 whose content is potentially older than one committed version, or internally maintained queues, and the log positioning information needed to rebuild their content.

During the current status phase, recovery manager 28 requests positioning of the log 40 at the start 98 of the most recently completed checkpoint 96. It then reads log 40 in a forward direction making the records of interest available to their contributing resource managers 21. A multiple pass operation will be required if different resource managers 21 last participated in different checkpoints 96, 94, . . . . The first pass starts reading at the most recent checkpoint 96 and goes forward through the log 40 to the end of file 136. Subsequent passes for those resource managers which did not participate in the most recent checkpoint start with the last checkpoint they did participate in (such as 94 or 92) and go forward to the end of their respective log interest scopes 86.

During this restart phase all non-cold starting resource managers 21 are eligible to receive the records they contributed, via log record presentation broadcasts from recovery manager 28. Typically, resource managers 21 which record summary information during a checkpoint 96 also log event records 106 indicating a change in the status of a resource 44 during normal processing. As an example, the transition of a recoverable work unit to a committing state is logged. Records of this type supplement the checkpoint records of the states of active recoverable work units. Records which represent additions to, or deletions from, an internal queue supplement checkpoint records which list the log positions of other elements on the queue as of the checkpoint event. Therefore, during this phase, in addition to their checkpoint records, resource managers 21 will also be interested in the individual event records 106 which follow the checkpoint records 96 and signify resource 44 state changes.

Recovery manager 28 provides resource managers 21 with the ability to establish record selection criteria for restart log record presentation broadcasts. The header portion of all recovery log 40 records 60, 61, 62, . . . (FIG. 2) contains the contributing resource manager's 21 identifier 80, generic record type, and where applicable a work unit identifier 63, 64, 65, . . . . Recovery manager 28 uses this information in determining the interest of a given resource manager 21 in a record.

Upon completion of the current status phase of restart each resource manager 21 is expected to have reconstructed the internal representation of the state of the resources 44 they manage. They also may have collected log 40 positioning information needed to retrieve and reconstruct obsolete data base media content, internal queues, and so forth, during the subsequent restart phases. As an example, recovery manager 28 as a participating resource manager 21, has reconstructed restart unit of recovery elements 90 representing all recoverable work units interrupted by a prior subsystem 20 termination 136, identified the type of work unit recovery (REDO, TODO, or UNDO) each must undergo based on its interrupted progress state, and established log positioning boundaries for each.

Second Restart Phase (a) Unit of Recovery (UR) Forward Recovery Phase

Referring still to FIG. 7, the forward recovery phase includes work unit UR forward recovery and resource manager RM forward recovery. The UR forward recovery phase deals with those work units which were interrupted by an unplanned subsystem 20 termination 136 after the subsystem domain 20 had agreed to commit the work unit's actions, but before the completion of those actions was guaranteed by resource managers 21. Two types of interrupted work units are addressed: (1) Work units whose actions have been committed by all domains 20, 32, . . . . These are identifiable by the presence of logged events. By participating in REDO work unit recovery processes resource managers repeat the committed actions and insure externalization of those actions. (2) A subset of the work units may be "commit-in-doubt", where the commit decision of coordinating domain 32 is unknown. The work units in this subset are identifiable by the absence of events logged to recovery log 40. Resource managers 21 participate in TODO work unit recovery processes, and make the resources 44 affected inaccessible to further activity until the decision is known and acted upon.

(b) Resource Manager (RM) Forward Recovery Phase

Referring still to FIG. 7 in connection with FIG. 6, the second purpose of the forward recovery phase is to provide resource managers 21 with the means of collecting information from log 40 which is not associated with interrupted work units. This information is typically used when the data base 44 media contains objects potentially older than one committed version. Segments of the media must be updated to reflect the actions of completed (not interrupted) work units. Another use is to rebuild the contents of a queue whose elements only exist on log 40. When establishing their record selection criteria for this phase, resource managers can provide recovery manager 28 with a beginning interest scope log position, or a list of log positions.

Recovery manager 28 requests the log be positioned at the earliest log position of interest to any resource manager. As shown in FIG. 7, this may be before, at, or after BUR 112. It then reads log 40 in a forward direction. All non-COLD starting resource managers are eligible to participate in the forward recovery phase of restart. This RM forward recovery phase then proceeds as follows:

(1) Records of interest within a resource manager's specified interest scope or list are passed to the resource manager by way of log record presentation broadcasts.

(2) Each resource manager 21 which may have recovery responsibilities associated with a work unit receives an appropriate BEGIN REDO or TODO event notification broadcast on a per-work-unit basis.

(3) Participating resource managers 21 receive their records of interest for REDO or TODO work unit recovery processing via log record presentation broadcasts. Typically they would be interested in the log records containing the after-update images of altered recoverable objects. For REDO processes, resource managers 21 can indicate whether or not they handled the recovery responsibilities when responding to the broadcasts. A not-handled situation would exist if the activation of a subset of the resources 44 managed by the resource manager 21 and needed for work unit recovery was being deferred. For TODO processes, recovery manager 28 remembers resource managers as having outstanding recovery responsibilities based on the existence of, and their interest in, records contributed on behalf of those work units.

(4) Each resource manager which received a BEGIN REDO or TODO broadcast also receives a log record presentation broadcast indicating the end of the work unit's logged activity has been reached.

(5) Recovery manager 28 recognizes those resource managers 21 which have completed their recovery responsibilities associated with a given work unit, and bypasses them if other resource managers 21 having outstanding responsibilities necessitate subsequent REDO or TODO processing of the work unit.

(6) Recovery manager 28 remembers the outstanding work unit recovery responsibilities of non-restarting resource managers 21 based on the existence of log 40 records contributed by them on behalf of interrupted work units.

(7) Recovery manager 28 remembers the implied completion of work unit recovery responsibilities for all COLD starting resource managers 21.

Third Restart Phase—Backward Recovery Phase

Referring to FIG. 7, during the backward recovery phase the processes necessary to recover those work units which were interrupted by an unplanned subsystem 20 termination 136 before they reached a new point of consistency are performed. By participating in UNDO work unit recovery processes, resource managers 21 reverse the actions of each interrupted work unit such that resources 44 altered by the work unit are restored to their prior consistent state.

To start the phase, recovery manager 28 requests log positioning at the end of the most recent interrupted log activity scope 136. It then reads log 40 in a backward direction until the log activity scopes of all work units requiring UNDO processing have been read. All non-COLD starting resource managers 21 are eligible to participate in this backward recovery phase of restart, which proceeds as follows:

(1) Each resource manager 21 which may have recovery responsibilities associated with a work unit receives a BEGIN UNDO event notification broadcast on a "per-work-unit" basis.

(2) Participating resource managers 21 receive their records of interest for UNDO work unit recovery processing via log record presentation broadcasts. Resource managers 21 are typically interested in the log records containing the before-update images of altered recoverable objects 44. Resource managers 21 can indicate whether or not they handled the recovery responsibilities when responding to the broadcasts. Deferred activation of a resource 44 subset could result in a non-handled response.

(3) Each resource manager 21 which received a BEGIN UNDO broadcast also receives a log record presentation broadcast indicating the end of the work unit's logged activity when it is reached.

(4) Recovery manager 28 recognizes those resource managers 21 which have completed their recovery responsibilities associated with a given work unit, and bypasses them if other resource managers having outstanding responsibilities necessitate subsequent UNDO work unit processing.

(5) Recovery manager 28 remembers the outstanding work unit recovery responsibilities of non-restarting resource managers 21 based on the existence of log records contributed by them on behalf of interrupted work units.

(6) Recovery manager 28 remembers the implied completion of work unit recovery responsibilities for all COLD starting resource managers 21.

Restart Completion

Prior to returning to the invoker, restart recovery manager 28, in its own control structure, indicates as active the resource managers 21 that were involved in the restart process. Control then returns to the initialization process. The initialization process invokes a checkpoint to record on recovery log 40 the completion of the startup and restart process. The resource manager status table 70 containing the operational states of the resource managers 21 is externalized to subsystem recovery data set 42 during the checkpoint event. Upon completion of the checkpoint the initialization process causes activation of the resource managers 21 and they become part of the operational subsystem 20.

Restart Process Modules

Figure 8:
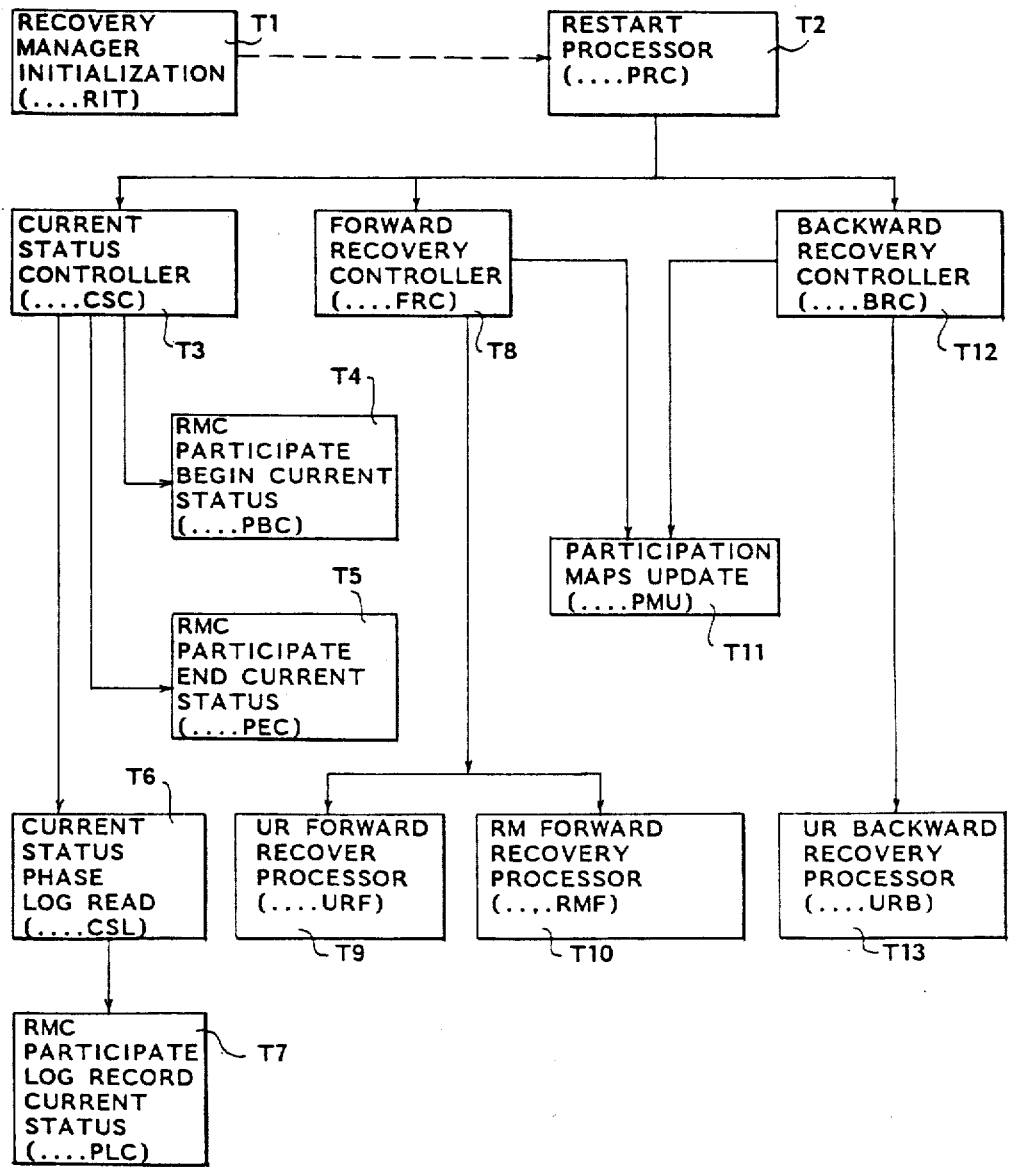
FIG. 8 is a diagrammatic illustration of the relationship between the various modules comprising the recovery manager component.

Referring now to FIG. 8, an introduction will be given to the procedures executed by recovery manager component 28. These procedures include recovery manager initialization (RIT) T1, restart processor (PRC) T2, current status controller (CSC) T3, RMC participate begin current status (PBC) T4, RMC participate end current status (PEC) T5, current status phase log read (CSL) T6, RMC participate log record current status (PLC) T7, forward recovery controller (FRC) T8, UR forward recovery processor (URF) T9, RM forward recovery processor (RMF) T10, participation maps update (PMU) T11, backward recovery controller (BRC) T12, and UR backward recovery processor (URB) T13. These procedures are each implemented in code modules in the tables which follow, and are interrelated as shown in FIG. 8. The reference numbers T1, T2, ... refer to the table number designations. The code of the tables is in pseudo code, selected for its clarity of presentation, and readily converted to executable code by those skilled in the art without undue experimentation.

Restart Process Storage Map

Figure 9:
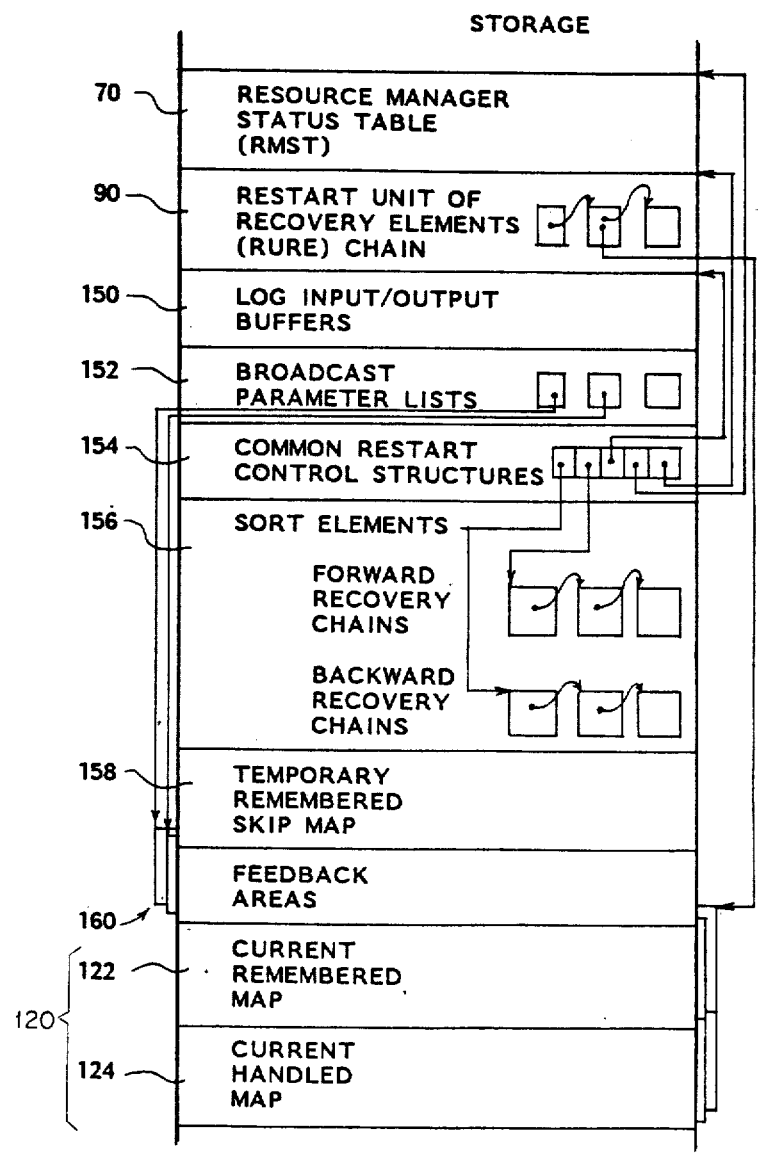
FIG. 9 is a diagrammatic illustration of various control structures maintained or accessed in main storage by the recovery manager component.

The code in the following tables references certain work areas and control blocks, including these already described and others set forth in FIG. 9. FIG. 9 is a diagrammatic view of the virtual storage of domain 20, and the various areas should not be considered to be contiguous as shown. Log input/output buffers interface recovery log 40 to recovery manager component 28, and are pointed to by one of common restart control structures 154, others of which anchor sort elements 156 forward and backward recovery chains, restart unit of recovery elements chain 90, and resource manager status table 70. Broadcast parameter lists 152 point to feedback areas 160, and the various RURE chain 90 elements point to maps 122, 124 pairs for each RURE. Also shown is temporary remembered skip map 158, the use of which will be described in the tables.

Recovery Manager Initialization

Recovery manager initialization, Table 1, performs the initial loading of the resource manager status table RMST 70 from subsystem recovery data set 42. This module RIT is entered as part of the subsystem 20 startup process, wherein each resource manager RM 21 participates in its own initialization. The RMST 70 as recorded in recovery data set 42 represents the latest existing copy of the RMST 70 as of the most recent checkpoint 96 taken prior to the subsystem terminating 136. The RMST entries 73 as recorded indicate the status of all resource managers 21 known to the system 20 at the time of the checkpoint 96. The RMST header 71 is written at the completion of each checkpoint and contains the log RBA 72 of the start of that checkpoint. The RMST entries 73 are only written when one or more RMs 21 either start up or shut down. A TERMINATED status 82, and the BEGIN_SCOPE 84 and END_SCOPE 86 values delimiting an RM's 21 normal termination checkpoint are indicated in the RMs 21 RMST entry 73 during the checkpoint 96.

If an RMST 70 does not exist (and other appropriate checks are met) an initial RMST 70 is formatted and recorded to recovery data set 42.

TABLE

| RECOVERY MANAGER INITIALIZATION |
|---|
| *PSEUDOCODE* |
| RIT: PROCEDURE RECOVERY MANAGER |
| INITIALIZATION. |
| OBTAIN STORAGE FOR THE RMST AND AN I/O BUFFER. |
| READ THE RMST HEADER INTO THE RMST HEADER |
| AREA. |
| IF NO RECORD IS FOUND (ASSUMES 1ST TIME |
| AND A RMST MUST BE BUILT) THEN |
| DO. |
| INITIALIZE THE RMST HEADER. |
| INITIALIZE ALL RMST ENTRIES AS UNDEFINED. |
| DO FOR ALL RMST ENTRY RECORDS. |
| MOVE THE RMST ENTRIES TO THE I/O BUFFER. |
| WRITE THE RMST ENTRY RECORDS. |
| END. |
| END. |
| ELSE |
| DO. |
| DO UNTIL ALL RMST ENTRY RECORDS ARE READ. |
| READ THE RMST INTO THE I/O BUFFER. |
| MOVE THE RMST ENTRY TO THE RMST ENTRY AREA. |
| END. |
| DO FOR ALL RMST ENTRIES. |
| IF THE RM IS KNOWN TO BE COLD STARTING THEN |
| DO. |
| SET THE RMST STATUS TO 'COLD_STARTING'. |
| SET BEGIN_SCOPE = END_SCOPE = MINIMUM LOG |
| RBA VALUE |
| (ABSOLUTE BEGINNING OF THE LOG). |
| END. |
| ELSE. |
| IF THE RMST SHOWS THE RM WAS 'ACTIVE' THEN |
| DO. |
| SET THE RMST STATUS TO |

TABLE -continued
RECOVERY MANAGER INITIALIZATION

'TERMINATED_WITH_SUBSYSTEM'.
SET BEGIN_SCOPE =
MOST_RECENT_CHECKPOINT_RBA
FROM THE RMST HEADER.
SET END_SCOPE = MAXIMUM LOG RBA VALUE
(ABSOLUTE END OF THE LOG).
END.
ELSE.
END.
END.
RELEASE STORAGE FOR I/O BUFFER.
RETURN TO CALLER.
*ENDPCODE

Recovery Manager Restart Processor

Recovery manager restart processor (PRC) T2 is the high level module that controls the entire restart process. It is called by the subsystem component which controls the starting of all or a subset of the resource managers RM 21 that make up subsystem 20. It is called as part of a total subsystem 20 restart, and also when any subset of subsystem 20 is restarting after the rest of subsystem 20 is operational. An input parameter to this function is a 256 bit map, whose bit positions represent RM 21 identifiers. A '1' in a given bit position indicates the corresponding RM 21 is restarting. A '0' indicates the corresponding RM 21 is either undefined (not known to subsystem 20), or not restarting. Bit position '0' (i.e. RM 21 identifier '0') is reserved as unused. This format is also used in the participation maps 120 which indicate resource managers 21 completed or uncompleted recovery responsibilities associated with interrupted work unit activity as well as several other restart control maps.

Restart processor T2 calls the modules T3, T8, T12 that control the three restart phases. When the three phases complete, it insures that the RMST 70 entries representing the restarting RMs 21 now reflect them as being active (status field 82). It insures that the proper end of log interest scope 86 is reflected in the RMST entries 73 for RMs 21 which previously terminated with subsystem 20 but which are not restarting now.

After restart processor T2 returns control to its caller, the checkpoint function is initiated. This in turn causes RMST 70 to be externalized to recovery data set 42, thereby establishing a new point from which any subsequent restart processing would begin.

TABLE 2
RECOVERY MANAGER RESTART PROCESSOR

*PSEUDOCODE*
PRC: PROCEDURE RESTART PROCESSOR.
OBTAIN CONTROL STRUCTURE, PARAMETER LISTS,
LOG I/O BUFFER,
AND WORKING STORAGE.
SAVE THE INPUT BIT MAP AS THE
RESTARTING_RM_MAP.
DO FOR ALL RESTARTING RMS.
NOTIFY THE RM OF THE START OF RESTART.
IF FEEDDACK INDICATES THE RM IS COLD STARTING
THEN
DO.
SET THE RMST STATUS AS 'COLD_STARTING'.
SET BEGIN_SCOPE = END_SCOPE = MINIMUM LOG
RBA VALUE.
END.
ELSE.
IF THE RMST STATUS IS 'COLD STARTING' THEN
INDICATE THE RM IN A COLD_STARTING_BIT_MAP.
ELSE.

TABLE 2-continued
RECOVERY MANAGER RESTART PROCESSOR

END.
CALL THE CURRENT STATUS CONTROLLER (CSC).
CALL THE FORWARD RECOVERY CONTROLLER (FRC).
CALL THE BACKWARD RECOVERY CONTROLLER (BRC).
DO FOR ALL RMST ENTRIES.
IF THE RM IS RESTARTING THEN
DO.
SET THE RMST STATUS TO 'ACTIVE'.
NOTIFY THE RM OF THE END OF RESTART.
END.
ELSE
DO.
IF THE RMST END_SCOPE = MAXIMUM LOG RBA
VALUE THEN
SET END_SCOPE = CURRENT END OF LOG RBA.
ELSE.
IF THE RMST STATUS IS 'TERMINATED' THEN
SET THE RMST STATUS AS 'TERMINATED_EARLY'.
ELSE.
END.
END.
RELEASE ALL STORAGE.
RETURN TO CALLER.
*ENDPCODE:

Recovery Manager Current Status Controller

Recovery manager current status controller (CSC) T3 controls the current status phase of restart. It is called by restart processor T2 and is passed pointers to the bit maps and other common restart control structures 152. This module performs the notification broadcasts that delimit this restart phase. It performs the phase for each group of RMs 21 which previously terminated as a group and are restarting as a group at this time (i.e. those having common beginning log scopes of interest 84). When restarting after a complete subsystem 20 termination, those RMs 21 which terminated with subsystem 20 and are restarting as a group this time will be processed through the current status phase first. If one or more RMs 21 are restarting with subsystem 20, but terminated as a group prior the termination of subsystem 20, they will be processed as a subsequent group.

The same process occurs when one or more RMs 21, or RM 21 groups, are being activated after subsystem 20 is operational.

TABLE 3
RECOVERY MANAGER CURRENT STATUS CONTROLLER

*PSEUDOCODE*
CSC: PROCEDURE CURRENT STATUS CONTROLLER.
DO FOR ALL RESTARTING RMS.
DO FOR ALL RMS HAVING A COMMON BEGIN_SCOPE.
IF THE RM IS NOT COLD STARTING THEN
SET TO BEGIN READING THE LOG AT THE
BEGIN_SCOPE RBA.
ELSE
NOTIFY THE RESTARTING RM OF THE START OF THE
CURRENT STATUS PHASE.
IF THE RM IS NOT COLD STARTING THEN
SAVE RECORD_SELECTION_CRITERIA FEEDBACK
FROM THE RM.
ELSE.
CALL THE CURRENT STATUS PHASE LOG READ (CSL).
END.
NOTIFY THE RESTARTING RM OF THE END OF THE
CURRENT STATUS PHASE.
IF THE RM IS NOT COLD STARTING THEN
IF THE RM RETURNED ANY FEEDBACK TO THE
END PHASE NOTIFICATION THEN
SAVE THE RM'S NEXT PHASE LOG POSITIONING RBAS
AND RECORD_SELECTION_CRITERIA RETURNED AS
FEEDBACK.

TABLE 3-continued
RECOVERY MANAGER CURRENT STATUS CONTROLLER

ELSE.
ELSE.
END.
RETURN TO CALLER.
*ENDPCODE:

Recovery Manager Participate Begin Current Status Broadcast

Recovery manager participate begin current status broadcast (PBC) T5 receives the begin current status phase event notification broadcast from current status controller T3. It is passed a broadcast parameter list 152 and a feedback area 160 as input. Recovery manager 28 as a subsystem component participates in this event notification broadcast just like other RMs 21 of subsystem 20. This module performs the phase initializing functions on behalf of recovery manager component 28, including declaring interest in certain log 40 records during the phase. It then returns control to the broadcasting module, current status controller T3.

TABLE 4
RECOVERY MANAGER PARTICIPATE BEGIN CURRENT STATUS BROADCAST

*PSEUDOCODE*
PBC: PROCEDURE RMC PARTICIPATE BEGIN CURRENT STATUS.
OBTAIN WORK AREA STORAGE.
PROVIDE FEDBACK DECLARING INTEREST IN CHECKPOINT
AND UR CONTROL RECORD TYPES DURING THE CURRENT STATUS PHASE.
RETURN TO BROADCASTER
*ENDPCODE:

Recovery Manager Participate End Current Status Broadcast

Recovery manager participate end current status broadcast (PEC) T5 receives the end current status phase event notification broadcast from current status controller T3. It is passed a broadcast parameter list 152 and a feedback area 160 as input. It performs the phase cleanup functions on behalf of recovery manager component 28, and declares that recovery manager 28 has no interest in log 40 records during the next phase. The module then returns control to the broadcasting module.

TABLE 5
RECOVERY MANAGER PARTICIPATE END CURRENT STATUS BROADCAST

*PSEUDOCODE*
PEC: PROCEDURE RMC PARTICIPATE END CURRENT STATUS.
RELEASE WORK AREA STORAGE.
PROVIDE FEEDBACK DECLARING NO INTEREST IN LOG RECORDS
DURING THE NEXT RESTART PHASE.
RETURN TO BROADCASTER.
*ENDPCODE:

Recovery Manager Current Status Phase Log Read

Recovery manager current status phase log read (CSL) T6 performs the functions of reading log 40 forward from a RM 21 group's common beginning log interest scope 84, and passing each record to those RMs 21 whose record selection criteria the record meets. One selection criteria is that it must be within the RM's log interest scope 84, 86. Except for certain subsystem 20 records, a record on log 40 can only be viewed by its contributing RM 21.

This module returns to its caller, the current status controller T3, when either the end of log 40 is reached, or the log is read beyond the ending interest scope 86 of all the RMs 21 in the group.

This module also recognizes log records representing work unit activity and advances the end of activity scope RBA 114 in RUREs 90 representing work units which may require UNDO recovery processing.

TABLE 6
RECOVERY MANAGER CURRENT STATUS PHASE LOG READ

*PSEUDOCODE*
CSL: PROCEDURE CURRENT STATUS LOG READ.
DO FOR ALL RMS HAVING A COMMON BEGIN_SCOPE
AND NOT COLD STARTING.
DO UNTIL THE END_SCOPE RBAS FOR ALL RMS HAVE BEEN REACHED,
OR THE END OF LOG IS REACHED.
DO UNTIL A RECORD IS READ OR THE END OF LOG IS REACHED.
READ THE LOG FORWARD.
END.
IF THE END OF LOG IS NOT REACHED THEN
DO.
DO FOR EACH RM WHERE THE RECORD MEETS THE RM'S
RECORD_SELECTION_CRITERIA.
PASS THE RECORD TO THE RM.
END.
IF THE RECORD IS FOR A UNIT OF RECOVERY (UR) THEN
DO
LOCATE THE RURE USING THE LOG RECORD'S UR IDENTIFIER.
IF A MATCHING RURE IS FOUND
AND THE STATUS INDICATES 'UNDO' PROCESSING IS NEEDED
AND THE RECORD'S RBA IS GREATER THAN THE RURE 'END_ACTIVITY_SCOPE' THEN
SAVE RECORD'S RBA IN RURE AS 'END_ACTIVITY_SCOPE'.
ELSE.
END.
ELSE.
END.
ELSE.
END.
END.
RETURN TO CALLER.
*ENDPCODE:

Recovery Manager Participate Log Record Current Status Broadcast

Recovery manager participate log record current status broadcast (PLC) T7 creates recovery manager's 28 structural representation of a unit of recovery (UR) for which recovery actions are required. The structures are known as restart unit of recovery elements 90 (RUREs). They may represent those URs which were active at the most recent subsystem 20 termination 136, or may be URs carried over from a previous restart process because all recovery actions had not been completed on their behalf. The module is passed log 40 records which are of interest to recovery manager 28 from the current status phase log read module T6. The records it receives are recovery manager's 28 contributed checkpoint type records and UR control type records. A broadcast parameter list 152 and a feedback area 160 are also provided as input.

From the checkpoint records 101, ..., PLC T7 builds new RUREs 90 representing URs which were active at the time of checkpoint 96. It also builds RUREs 90 from checkpoint records representing previously interrupted URs which have been remembered and carried forward by recovery manager 28 because recovery responsibilities have not yet been completed.

Using UR control log records 106, PLC T7 advances the progress states of the URs as represented by RUREs 90. It builds new RUREs 90 when 'begin-UR' log records are encountered, and deletes RUREs when they reach a 'UR completed' state. The module returns control to the broadcasting module after processing each record of interest.

TABLE 7
RMC PARTICIPATE LOG RECORD CURRENT STATUS

```
*PSEUDOCODE*
PLC: PROCEDURE RMC PARTICIPATE LOGREC
CURRENT STATUS.
IF THE RECORD TYPE IS CHECKPOINT THEN
IF THE RECORD SUBTYPE IS FOR CHECKPOINTED
ACTIVE URS THEN
DO FOR ALL URS IN THE RECORD.
CREATE A NEW RURE WITH NULL RM PARTICIPATION
MAPS.
IF THE UR STATUS IS INSURE-COMMIT OR
COMMIT-INDOUBT THEN
SET THE RURE END_ACTIVITY_SCOPE FROM THE
CONTENTS OF
THE RECORD
ELSE
SET THE RURE END_ACTIVITY_SCOPE TO BE THE
CHECKPOINT
RECORD RBA.
CHAIN THE RURE.
END.
EISE (THE RECORD IS A CARRYOVER RURE CHECK-
POINT
DO FOR ALL THE RURES IN THE RECORD.
CREATE A RURE WITH THE PRIOR PARTICIPATION
MAPS' CONTENTS.
IF THE RURE END_ACTIVITY_SCOPE IS NOT
PREVIOUSLY KNOWN
THEN
SET THE RURE END_ACTIVITY_SCOPE TO BE THE
CHECKPOINT
RECORD RBA.
ELSE.
CHAIN THE RURE.
END.
ELSE (THE RECORD IS A UR CONTROL TYPE)
IF THE RECORD SUBTYPE IS EITHER END_REDO,
END_TODO
OR END_UNDO THEN
DO.
LOCATE THE UR'S RURE USING IHE UR IDENTIFIER
FROM THE RECORD.
IF A MATCHING RURE IS FOUND THEN
DO.
UPDATE THE RURE PARTICIPATION MAPS WITH
THE RECORD CONTENT
IF THE RURE _REMEMBERED _MAP IS ALL ZEROS
(RM RESPONSIBILITIES HAVE BEEN COMPLETED) THEN
UNCHAIN AND FREE THE RURE.
ELSE.
END.
ELSE.
END
ELSE (THE RECORD IS SOME OTHER UR CONTROL
SUBTYPE)
IF THE RECORD SUBTYPE IS 'BEGIN_UR' THEN
DO.
CREATE A NEW RURE WITH NULL RM PARTICIPATION
MAPS.
CHAIN THE RURE.
END.
ELSE.
```

TABLE 7-continued
RMC PARTICIPATE LOG RECORD CURRENT STATUS

```
IF THE RECORD HAS A MATCHIHG RURE. USING THE UR
IDENTIFIER, THEN
DO.
ADVANCE THE UR STATE IN THE RURE BASED ON
THE UR CONTROL RECORD SUBTYPE.
IF THE UR IS IN A COMPLETED STATE
(I.E. END_COMMIT OR END_ABORT) THEN
UNCHAIN AND FREE THE RURE.
ELSE.
END.
ELSE.
RETURN TO BROADCASTER.
*ENDPCODE:
```

Recovery Manager Forward Recovery Controller

Recovery manager forward recovery controller (FRC) T8 controls all of the forward recovery functions of the restart process, and sets up for the backward recovery functions. It is called by restart processor T2 and is passed pointers to the common restart control structures 154. Log positioning information optionally returned by an RM 21 as feedback to the end of the current status phase broadcast together with the RM's 21 end of log interest scope 86 as contained in its RMST entry 73 are placed in sort elements 156. Sort elements containing the beginning and ending log activity scope values 110 for RUREs 90 requiring recovery actions are also created by this module.

The RM 21 log positioning and end of log interest scope sort elements are combined with the sort elements created for URs requiring forward recovery (REDO or TODO) processing and sorted in ascending RBA sequence.

The sort elements created for URs requiring backward recovery (UNDO) processing are sorted in descending RBA sequence and are processed later by backward recovery controller T12.

Forward recovery controller T8 notifies RMs 21 of the start of the phase. Using the ascending sequenced sort elements module T8 then positions the log, bypassing the gaps where the records are outside any scope of interest 84, 86 or UR activity scope 110. Records within scopes of interest or UR activity are read in a forward direction. As each record is read, it is passed to two routines: UR forward recovery processor (URF) T9 passes the log records associated with URs requiring REDO or TODO processing to the RMs 21 having an interest in those records; and RM forward recovery processor (RMF) T10 passes to RMs 21 the records which meet their specific forward recovery selection criteria.

When all records required for forward recovery have been read and processed, this module calls participation maps update (PMU) T11. PMU T11 determines whether or not the recovery responsibilities of all RMs 21 have been handled on behalf of the work units requiring REDO or TODO forward recovery processing.

The forward recovery controller T8 broadcasts the end of the phase to the restarting RMs 21 and returns control to its caller, restart processor T2.

TABLE 8
RECOVERY MANAGER FORWARD RECOVERY CONTROLLER

```
*PSEUDOCODE*
FRC: PROCEDURE FORWARD RECOVERY CONTROLLER.
```

TABLE 8-continued
RECOVERY MANAGER FORWARD RECOVERY CONTROLLER

```
DO FOR ALL RESTARTING RMS.
DO FOR ALL NON-COLD STARTING RMS.
DO FOR ALL RMS WHICH NOMINATED A LOG
POSITIONING RBA FOR
THIS PHASE.
BUILD ONE SORT ELEMENT WITH THE RM'S
END_SCOPE RBA
(FROM THE RMST).
BUILD ONE SORT ELEMENT FOR THE RM'S NOMINATED
RBA.
SORT IN ASCENDING RBA SEQUENCE FOR FORWARD
RECOVERY.
END.
END.
END.
DO FOR ALL RURES REPRESENTING URS REQUIRING
RECOVERY ACTIONS.
INDICATE 'CURRENTLY_IN_RECOVERY' IN THE RURE.
BUILD ONE SORT ELEMENT WITH
BEGIN_ACTIVITY_SCOPE RBA FOR EACH UR.
BUILD ONE SORT ELEMENT WITH
END_ACTIVITY_SCOPE RBA FOR EACH UR.
OBTAIN STORAGE FOR TWO CURRENT PARTICIPATION
BIT MAPS FOR EACH UR.
DO.
INDICATE IN THE UR'S CURRNT_HANDLED_MAP
ANY COLD
STARTING RMS WHICH HAD RECOVERY
RESPONSIBILITIES CARRIED
OVER AS OUTSTANDING IN THE UR'S
RURE_REMEMBERED_MAP.
END.
IF THE RURE STATUS INDICATES 'REDO' OR 'TODO'
PROCESSING THEN
DO.
MERGE THE SORT ELEMENTS WITH THE RM SORT
ELEMENTS IN ASCENDING RBA SEQUENCE FOR
FORWARD RECOVERY.
END.
ELSE (THE RURE STATUS MUST INDICATE 'UNDO'
PROCESSING)
DO.
SORT THE SORT ELEMENTS IN DESCENDING RBA
SEQUENCE FOR BACKWARD RECOVERY.
END.
END.
DO FOR ALL RESTARTING RMS.
NOTIFY THE RM OF THE START OF THE FORWARD
RECOVERY PHASE.
SAVE THE 'REDO' AND 'TODO'
RECORD_SELECTION_CRITERIA FEEDBACK.
END.
OBTAIN THE FIRST FORWARD RECOVERY SORT
ELEMENT.
DO FOR ALL FORWARD RECOVERY SORT ELEMENTS.
OR UNTIL THE END OF LOG IS REACHED.
IF THE SORT ELEMENTS INDICATE THE LOG IS
POSITIONED OUTSIDE
AN INTEREST OR ACTIVITY SCOPE THEN
SET TO BEGIN LOG READING AT THE BEGINNING OF
THE NEXT SCOPE.
ELSE. (THE LOG IS POSITIONED WITHIN A SCOPE)
DO UNTIL A RECORD IS READ OR THE END OF LOG IS
REACHED.
READ THE LOG FORWARD.
END.
IF THE END OF THE LOG HAS NOT BEEN REACHED
THEN
DO.
CALL THE UR FORWARD RECOVERY PROCESSOR (URF).
CALL THE RM FORWARD RECOVERY PROCESSOR (RMF).
IF JUST PROCESSED A RECORD REPRESENTED BY THE
RBA IN THE
CURRENT SORT ELEMENT THEN
OBTAIN THE NEXT SORT ELEMENT IN SEQUENCE.
ELSE.
END.
ELSE.
END.
DO FOR ALL RURES REPRESENTING URS REQUIRING
```

TABLE 8-continued
RECOVERY MANAGER FORWARD RECOVERY CONTROLLER

```
RECOVERY ACTIONS.
IF THE RURE STATUS INDICATES 'REDO' OR 'TODO'
PROCESSING
AND THE RURE IS 'CURRENTLY_IN_RECOVERY' THEN
CALL THE PARTICIPATION MAPS UPDATE ROUTINE
(PMU).
ELSE.
END.
DO FOR ALL RESTARTING RMS.
NOTIFY THE RM OF THE END OF THE FORWARD
RECOVERY PHASE.
END.
RETURN TO CALLER.
*ENDPCODE:
```

Recovery Manager UR Forward Recovery Processor

Recovery manager UR forward recovery processor (URF) T9 is called by FRC T8 and is passed pointers to the common restart control structures 154, and to a log 40 record. The module determines whether or not the record is part of the log activity scope 110 of a UR requiring REDO or TODO forward recovery actions.

If forward recovery actions are required for the UR, each restarting RM 21 which has unfulfilled recovery responsibilities associated with the UR and is interested in the record type is first notified that recovery actions are beginning for the UR, and is then passed the record. For URs requiring REDO recovery processing, the RMs 21 can respond and indicate whether or not they handled the record. This is retained by the module in participation maps 120 associated with the UR. If the UR requires TODO recovery processing, or for the non-restarting RM which contributed the log record and has not fulfilled its recovery responsibilities, the module remembers the RM's 21 outstanding responsibilities in participation maps 120 associated with the UR. The module returns control to its caller FRC T8, after processing a single record.

TABLE 9
RECOVERY MANAGE UR FORWARD RECOVERY PROCESSOR

```
*PSEUDOCODE*
URF: PROCEDURE UR FORWARD RECOVERY PROCESSOR.
IF THE RECORD REPRESENTS UR ACTIVITY (HAS A UR
INDENTIFIER THEN
DO.
LOCATE ITS MATCHING RURE USING THE RECORD'S UR
IDENTIFIER.
IF A MATCHING RURE IS FOUND
AND THE RURE STATUS INDICATES 'REDO' OR 'TODO'
PROCESSING
AND THE RURE IS 'CURRENTLY_IN_RECOVERY' THEN
DO.
IF IT IS THE 1ST RECORD READ FOR THE UR THEN
NOTIFY RESTARTING RMS HAVING UNFULFILLED
RESPONSIBILITIES THAT A NEW UR IS BEING
RECOVERED.
ELSE.
DO FOR ALL RMS.
IF THE RM IS RESTARTIHG THEN
IF THE RM IS NOT COLD STARTING
AND THE RECORD MEETS THE RM'S SELECTION
CRITERIA AND THE RM HAS NOT PREVIOUSLY
FULFILLED ITS RECOVERY RESPONSIBILITIES FOR
THIS UR THEN IF THE RURE STATUS INDICATES
'REDO'
PROCESSING THEN
DO.
PASS THE RECORD TO THE RM.
SAVE THE 'REMEMBERED/HANDLED' FEEDBACK IN
```

TABLE 9-continued
RECOVERY MANAGE UR FORWARD RECOVERY PROCESSOR

```
THE UR'S CURRENT PARTICPATION MAPS
END.
ELSE (MUST BE 'TODO' PROCESSING)
DO.
PASS THE RECORD TO THE RM.
INDICATE THE OUTSTANDING RECOVERY
RESPONSIBILITY IN THE UR'S
CURRENT_REMEMBERED_MAP.
END.
ELSE
IF THE RM IS COLD STARTING
AND THE RECORD MEETS THE RM'S SELECTION
CRITERIA THEN
INDICATE THE RM HAS COMPLETED ITS
RESPONSIBILITIES IN THE CURRENT_HANDLED_MAP.
ELSE.
ELSE
DO (THE RM IS EITHER NOT RESTARTING OR IS
UNDEFINED IN THE RMST).
IF THE RM WHICH CONTRIBUTED THE LOG RECORD IS
NOT
RESTARTING
AND THE RM HAS NOT PREVIOUSLY FULFILLED ITS
RECOVERY RESPONSIBILITIES FOR THIS UR THEN
DO.
INDICATE THE OUTSTANDING RECOVERY
RESPONSIBILITY IN THE UR'S
CURRENT_REMEMBERED_MAP.
END.
ELSE.
END.
END.
END.
ELSE.
(RURE WASN'T FOUND OR ITS STATUS WASN'T FOR
THIS PHASE)
END.
ELSE. (RECORD DOESN'T REPRESENT UR ACTIVITY)
RETURN TO CALLER.
*ENDPCODE:
```

Recovery Manager RM Forward Recovery Processor

Recovery manager RM forward recovery processor (RMF) T10 is called by forward recovery controller T8 and is passed pointers to the common restart control structures 154, and to a log 40 record. It passes to restarting RMs 21, other than those that are cold starting, a record which is within the RMs' scopes of interest and meets the RMs' record selection criteria. The module returns control to its caller after processing each record.

TABLE 10
RECOVERY MANAGER RM FORWARD RECOVERY PROCESSOR

```
*PSEUDOCODE*
RMF: PROCEDURE RM FORWARD RECOVERY PROCESSOR
DO FOR ALL RESTARTING RMS THAT ARE NOT
'COLD_STARTING'.
IF THE RECORD IS
WITHIN THE RM'S LOG POSITIONING AND 'END-SCOPE'
RBA RANGE
AND MEETS THE-RM'S RECORD_SELECTION_CRITERIA
THEN PASS THE RECORD TO THE RM.
ELSE.
END.
RETURN TO CALLER.
*ENDPCODE:
```

Recovery Manager Participation Maps Update Routine

Recovery manager participation maps update routine (PMU) Tll is called by forward recovery controller T8 and backward recovery controller T12 to establish the final settings of the participation maps 120 of a RURE 90. The module receives as input pointers to common restart control areas 154 and to a single RURE 90. After updating the maps, it unchains and frees any RUREs 90 whose maps 120 indicate that all recovery responsibilities have been completed. It returns control to its caller after processing each RURE 90.

TABLE 11
RECOVERY MANAGER PARTICIPATION MAPS UPDATE

```
*PSEUDOCODE*
PMU: PROCEDURE PARTICIPATION MAPS UPDATE
ROUTINE TEMP_REMEM_SKIP_MAP =
CURRENT_REMEMBERED_MAP
& CURRENT_HANDLED_MAP.
(A REMEMBER/SKIP FEEDBACK OPTION IS AVAILABLE
TO RMS WHEN PASSED RECORDS DURING UR
RECOVERY. THE OPTION IS TEMPORARILY RETAINED
IN THE CURRENT MAPS AS A BIT SET IN BOTH MAPS.
THE ABOVE STEP OBTAINS
A MAP OF ALL RMS
WHICH SELECTED THIS OPTION.)
IF THIS IS THE 1ST TIME THE RURE HAS BEEN
THROUGH RESTART (DOES NOT HAVE A PRIOR SET
OF PARTICIPATION MAPS) THEN
DO. (THE SPACE IN THE RURE FOR MAPS IS USED FOR
THE CURRENT PARTICIPATION MAPS)
RURE_REMEMBERED_MAP IS THE
CURRENT_REMEMBERED_MAP.
RURE_HANDLED_MAP = CURRENT_HANDLED_MAP
&& TEMP_REMEM_SKIP_MAP.
(THE ABOVE STEP CLEARS THE BIT SETTING IN THE
'HANDLED' MAP FOR RMS WHICH SELECTED THE
REMEMBER/SKIP OPTION.)
END.
ELSE (THE RURE IS A CARRY-OVER RURE)
DO. (UPDATE THE RURE PARTICIPATION MAPS WITH
THE CONTENTS OF THE CURRENT MAPS)
RURE_HANDLED_MAP =
PREV_RURE_HANDLED_MAP
| (CURRENT_HANDLED_MAP &&
(TEMP_REMEM_SKIP_MAP)).
(THE ABOVE STEP COMBINES THE SETTINGS OF THE
PREVIOUS AND CURRENT 'HANDLED' MAPS AND
INSURES THAT THE
REMEMBER/SKIP
OPTION SETTINGS ARE CLEARED.)
RESULT_A = RESTARTING_RM_MAP
&& CURRENT_REMEMBERED_MAP
(THE ABOVE STEP CREATES A MAP OF RESTARTING
RMS THAT
EITHR HANDLED ALL THEIR LOG
RECORDS THIS TIME, OR
DID NOT RECEIVE
ANY LOG RECORDS THIS TIME.)
RESULT_B = PREV_RURE_REMEMBERED_MAP
& RESULT_A.
(THE ABOVE STEP CREATES A MAP OF RMS THAT
RECEIVED RECORDS WHICH MET THEIR SELECTION
CRITERIA PREVIOUSLY, AND HAD NOT COMPLETED
THEIR RESPONSIBILITIES PREVIOUSLY,
BUT EITHER HANDLED ALL THEIR
RESPONSIBILITIES THIS TIME, OR CHANGED THEIR,
RECORD SELECTION CRITERIA SUCH THAT THEY
RECEIVED NO RECORDS THIS TIME.)
RURE_REMEMBERED_MAP =
PREV_RURE_REMEMBERED_MAP
&& RESULT_B.
(THE ABOVE STEP CLEARS THE BITS IN THE
'REMEMBERED' MAP FOR THOSE RMS WHICH EITHER
HANDLED THEIR RESPONSIBILITIES THIS TIME
OR RECEIVED NO RECORDS OF INTEREST
THIS TIME.)
FREE THE CURRENT PARTICIPATION MAP STORAGE.
END.
BUILD THE APPROPRIATE END_REDO, END_TODO OR
END_UNDO LOG RECORD WITH THE
CONTENTS OF THE RURE PARTICIPATION MAPS.
WRITE THE RECORD TO THE LOG.
IF THE RURE_REMEMBERED_MAP IS ALL ZEROS
```

TABLE 11-continued

RECOVERY MANAGER PARTICIPATION
MAPS UPDATE (RM RESPONSIBILITIES HAVE BEEN COMPLETED) THEN
UNCHAIN AND FREE THE RURE.
ELSE.
RETURN TO CALLER.
*ENDPCODE

Recovery Manager Backward Recovery Controller

Recovery manager backward recovery controller (BRC) T12 is called by restart processor T2 and is passed pointers to the common restart control structures 154. It controls all of the backward recovery functions of the restart process. During the forward recovery restart phase, forward recovery controller T8 created and sorted sort elements 156 for those work units requiring backward recovery actions. These are now processed by this module.

Backward recovery controller T12 notifies RMs 21 of the start of the phase. It then positions the log 40, bypassing the gaps where the records are outside of UR's activity scope 110. Records within the URs' activity scopes 110 are read in a backward direction and are passed to the UR backward recovery processor T13. UR backward recovery processor T13 performs the backward recovery control functions associated with interrupted work units.

When all records required for backward recovery have been read and processed this module calls the participation maps update routine T11, which determines whether or not the recovery responsibilities of all RMs 21 have been handled on behalf of the work units requiring UNDO backward recovery processing.

Backward recovery controller T12 broadcasts the end of the phase to the restarting RMs 21 and returns control to its caller, PRC T2.

TABLE 12

RECOVERY MANAGER BACKWARD
RECOVERY CONTROLLER

*PSEUDOCODE*
BRC: PROCEDURE BACKWARD RECOVERY CONTROLLER.
DO FOR ALL RESTARTING RMS.
NOTIFY THE RM OF THE START OF THE BACKWARD
RECOVERY PHASE.
SAVE THE 'UNDO' RECORD_SELECTION_CRITERIA
FEEDBACK.
END.
OBTAIN THE FIRST BACKWARD RECOVERY SORT
ELEMENT.
DO FOR ALL BACKWARD RECOVERY SORT ELEMENTS.
IF THE SORT ELEMENTS INDICATE THE LOG IS
POSITIONED OUTSIDE
ANY UR ACTIVITY SCOPE THEN
SET TO BEGIN LOG READING AT THE END OF THE
NEXT SCOPE.
ELSE.
DO UNTIL A RECORD IS READ.
READ THE LOG BACKWARD.
END.
CALL THE UR BACKWARD RECOVERY PROCESSOR (URB).
IF JUST PROCESSED A RECORD REPRESENTED BY THE
RBA IN THE
CURRENT SORT ELEMENT THEN
OBTAIN THE NEXT SORT ELEMENT IN SEQUENCE.
ELSE.
END.
DO FOR ALL RURES REPRESENTING URS REQUIRING
RECOVERY ACTIONS.
IF THE RURE STATUS INDICATES 'UNDO' PROCESSING
AND THE RURE IS 'CURRENTLY_IN_RECOVERY'
THEN

TABLE 12-continued

RECOVERY MANAGER BACKWARD
RECOVERY CONTROLLER

CALL THE PARTICIPATION MAPS UPDATE ROUTINE
(PMU).
ELSE.
END.
DO FOR ALL RESTARTING RMS.
NOTIFY THE RM OF THE END OF THE BACKWARD
RECOVERY PHASE.
END.
RETURN TO CALLER.
*ENDPCODE:

Recovery Manager UR Backward Recovery Processor

Recovery manager UR backward recovery processor (URB) T13 is called by backward recovery controller T12 and is passed pointers to the common restart control structures 154, and to a log 40 record. The module determines whether or not the record is part of the log activity scope 110 of a UR requiring UNDO backward recovery actions.

If backward recovery actions are required for the UR, each restarting RM 21 which has not previously fulfilled its recovery responsibilities associated with the UR and is interested in the record type is first notified that recovery actions are beginning for the UR, and is then passed the record. The RMs 21 respond indicating whether or not they handled the record. This is retained by the module in participation maps 120 associated with the RURE. For the non-restarting RM 21 which contributed the log record and has not fulfilled its recovery responsibilities, this module remembers the RM's outstanding responsibilities in the participation maps 120 associated with the UR. The module returns control to its caller, BRC T12, after processing each record.

TABLE 13

RECOVERY MANAGER UR BACKWARD RECOVERY
PROCESSOR

*PSEUDOCODE*
URB: PROCEDURE UR BACKWARD RECOVERY
PROCESSOR.
IF THE RECORD REPRESENTS UR ACTIVITY (HAS A UR
IDENTIFIER) THEN
DO.
LOCATE ITS MATCHING RURE USING THE RECORD'S
UR IDENTIFIER.
IF A MATCHING RURE IS FOUND
AND THE RURE STATUS INDICATES 'UNDO' PROCESSING
AND THE RURE IS 'CURRENTLY_IN_RECOVERY' THEN
DO.
IF IT IS THE 1ST RECORD READ FOR THE UR THEN
NOTIFY RESTARTING RMS HAVING UNFULFILLED
RESPONSIBILITIES THAT A NEW UR IS BEING
RECOVERED.
ELSE.
DO FOR ALL RMS.
IF THE RM IS RESTARTING THEN
IF THE RM IS NOT COLD STARTING
AND THE RECORD MEETS THE RM'S SELECTION
CRITERIA AND THE RM HAS NOT PREVIOUSLY
FULFILLED ITS RECOVERY RESPONSIBILITIES
FOR THIS UR THEN
DO.
PASS THE RECORD TO THE RM.
SAVE THE 'REMEMBERED/HANDLED' FEEDBACK IN
THE UR'S CURRENT PARTICIPATION MAPS
END.
ELSE
IF THE RM IS COLD STARTING
AND THE RECORD MEETS THE RM'S SELECTION
CRITERIA THEN
INDICATE THE RM HAS COMPLETED ITS

TABLE 13-continued

RECOVERY MANAGER UR BACKWARD RECOVERY PROCESSOR

```
RESPONSIBILITIES IN THE CURRENT_HANDLED_MAP.
ELSE.
ELSE.
DO (THE RM IS EITHER NOT RESTARTING OR IS
UNDEFINED IN THE RMST).
IF THE RM WHICH CONTRIBUTED THE LOG RECORD IS
NOT RESTARTING AND THE RM HAS NOT PREVIOUS-
LY FULFILLED ITS RECOVERY RESPONSIBILITIES
FOR THIS UR THEN
DO.
INDICATE THE OUTSTANDING RECOVERY
RESPONSIBILITY IN THE UR'S
CURRENT_REMEMBERED_MAP.
END.
ELSE.
END.
END.
END.
ELSE.
(RURE WASN'T FOUND OR ITS STATUS WASN'T FOR
THIS PHASE)
END.
ELSE. (RECORD DOESN'T REPRESENT UR ACTIVITY)
RETURN TO CALLER.
*ENDPCODE:
```

I claim:

1. Apparatus for restarting a computing system following interruption, including a plurality of resource managers that manage resource collections such as data bases, non-volatile storage means containing a recovery log on which are recorded checkpointed states and images of changes resulting from the execution of work unit instructions, a subset of said resource managers having responsibilities in the execution of work unit instructions and the recovery of work units during restart, said apparatus comprising:

first data structure means for recording for an interrupted work unit the location of a respective section of the recovery log which contains information of its activities and the recovery responsibility of each resource manager to the work unit;

second data structure means for recording for each resource manager its operational state and the location of a respective different section of the recovery log which contains information that particular resource manager needs to perform its recovery responsibility; and recovery means which receives and is responsive to information recorded in said first and second data structure means for restarting selected resource managers following interruption and deferring the restarting of other resource managers.

2. The apparatus of claim 1 wherein said recovery means further includes means for periodically recording on the non-volatile storage means a copy of the first data structure means when, at the conclusion of a restart operation, the recovery responsibilities of at least one resource manager have not been completed.

3. The apparatus of claim 2 wherein said recovery means further includes means for periodically recording on the non-volatile storage means a copy of said second data structure means and of changes thereto.

4. The apparatus of claim 3 wherein said recovery means further includes means for reading log records during a recovery operation to build from information therein said first data structure means.

5. The apparatus of claim 4, wherein said recovery means further includes means for reestablishing during a first restart phase the state of the resource collection managed by each resource manager being restarted, beginning with the most recent checkpointed state and then updated to the point of interruption using records of changes in the log.

6. The apparatus of claim 5, wherein said recovery means further includes means for extending, during a second restart phase for each resource manager being restarted, the state of the resource collections it manages to include those changes such resource manager is responsible for, by reallocating resource collections exclusively to work units interrupted while in a state wherein it was unknown whether the work units had been committed or not, and by writing into said non-volatile storage the most recent states of the resource collections which had been committed before interruption.

7. The apparatus of claim 6, wherein said recovery means further includes means for restoring during a third restart phase for each resource manager being restarted the resource collections altered by interrupted work units to return to the state to which it had most recently been committed.

8. A method for restarting a computing system following interruption, including a plurality of resource managers that manage resource collections such as data bases, a recovery log in non-volatile storage on which are recorded checkpointed states and images of changes resulting from the execution of work unit instructions, a subset of said resource managers having responsibilities in the execution of work unit instructions and the recovery of work units during restart, said method comprising the steps of:

recording in a first data structure means for an interrupted work unit the location of a respective section of the recovery log which contains information of its activities and the recovery responsibility of each resource manager to the interrupted work unit;

recording in a second data structure means for each resource manager the operational state of such resource manager and the location of a respective section of the recovery log which contains information such resource manager needs to perform its recovery responsibility; and responsive to information recorded in said first and second data structure means, restarting selected resource managers following interruption while deferring the restarting of other resource managers.

9. The method of claim 8 further including the steps of periodically recording on non-volatile storage a copy of the first data structure means when, at the conclusion of a restart operation, the recovery responsibilities of at least one resource manager have not been completed.

10. The method of claim 9 including the further steps of periodically recording on non-volatile storage a copy of said second data structure means and of changes thereto.

11. The method of claim 10 further including the step of reading log records during a recovery operation to build from information therein said first data structure means.

12. The method of claim 11, further including the step of reestablishing during a first restart phase the state of the resource collection managed by each resource manager being restarted, beginning with the most recent checkpointed state and then updated to the point of interruption using records of changes in the log.

13. The method of claim 12, further including the step of updating, during a second restart phase for each resource manager being restarted, the state of the resource collections it manages to include those changes such resource manager is responsible for, by reallocating resource collections exclusively to work units interrupted while in a state wherein it was unknown whether the work units had been committed or not, and by writing into said non-volatile storage the most recent state of the resource collections which had been committed before interruption.

14. The rethod of claim 13, further including the step of restoring during a third restart phase for each resource manager being restarted the resource collections altered by interrupted work units to the state which had most recently been comritted.

15. A method for facilitating the restarting of a computing system that is interrupted from time to time, the system having a plurality of resource managers that manage resource collections such as data bases, a recovery log in non-volatile storage on which are recorded checkpointed states and images of changes resulting from the execution of work unit instructions, a subset of said resource managers having responsibilities in the execution of work unit instructions and the recovery of work units after interruption, said method comprising the steps of:
(a) recording for each interrupted work unit the location of a respective section of the recovery log which contains information of its activities and the recovery responsibility of each resource manager to the work unit;
(b) recording for each resource manager of said subset: (1) its operational state and (2) the location of a respective different section of the recovery log which contains the information that particular resource manager needs to perform its recovery responsibility; and
(c) following each interrupt, restarting at least one resource manager in response to the information recorded in steps (a) and (b).

16. The method of claim 15 wherein the restarting step (c) comprises the further steps of:
reestablishing the state of the resource collections managed by each resource manager being restarted, beginning with the most recent checkpointed state and then updated to the point of interruption using records of changes in the log;
extending, for each resource manager being restarted, the state of the resource collections such resource manager manages to include those changes it is responsible for, by reallocating resource collections exclusively to work units interrupted while in states wherein it is unknown whether the work units have been committed or not, and by writing into said non-volatile storage the most recent states of the resource collections which had been committed before interruption; and
restoring, for each resource manager being restarted, the resource collections altered by interrupted work units to return to the state to which it had most recently been committed.

* * * * *